(12) United States Patent
Idemura et al.

(10) Patent No.: US 8,044,116 B2
(45) Date of Patent: Oct. 25, 2011

(54) PIGMENT DISPERSION, AQUEOUS PIGMENT LIQUID DISPERSION, AND INK-JET RECORDING INK

(75) Inventors: Satoshi Idemura, Saitama (JP); Atsuo Kobayashi, Niiza (JP)

(73) Assignee: DIC Corporation, Tokyo (JP)

(*) Notice: Subject to any disclaimer, the term of this patent is extended or adjusted under 35 U.S.C. 154(b) by 503 days.

(21) Appl. No.: 12/280,241

(22) PCT Filed: Feb. 23, 2007

(86) PCT No.: PCT/JP2007/053408
§ 371 (c)(1),
(2), (4) Date: Aug. 21, 2008

(87) PCT Pub. No.: WO2007/097425
PCT Pub. Date: Aug. 30, 2007

(65) Prior Publication Data
US 2010/0227958 A1    Sep. 9, 2010

(30) Foreign Application Priority Data
Feb. 24, 2006 (JP) .................. 2006-048388

(51) Int. Cl.
*C09D 11/10* (2006.01)
(52) U.S. Cl. ......... 523/161; 524/388; 524/190; 524/562
(58) Field of Classification Search .................. None
See application file for complete search history.

(56) References Cited

U.S. PATENT DOCUMENTS

| 6,538,047 B1 | 3/2003 | Miyabayashi |
| 6,818,054 B2 | 11/2004 | Sano et al. |
| 7,094,813 B2 | 8/2006 | Namba et al. |
| 2002/0112642 A1 | 8/2002 | Sharma et al. |
| 2003/0019398 A1* | 1/2003 | Komatsu et al. ............... 106/412 |
| 2005/0054751 A1 | 3/2005 | Namba et al. |

FOREIGN PATENT DOCUMENTS

| EP | 1088865 A1 | 4/2001 |
| EP | 1217048 A1 | 6/2002 |
| JP | 2002-241662 A | 8/2002 |
| JP | 2003-335987 A | 11/2003 |
| JP | 2004-2698 A | 1/2004 |
| JP | 2005-060411 A | 3/2005 |
| JP | 2005-060419 * | 3/2005 |
| JP | 2005-060419 A | 3/2005 |

OTHER PUBLICATIONS

Machine translation of JP 2005-060419.*
International Search Report of PCT/JP2007/053408, date of mailing Mar. 20, 2007.
Supplementary European Search Report dated Mar. 11, 2011 issued in corresponding European Patent Application No. 07737347.

* cited by examiner

*Primary Examiner* — Milton I Cano
*Assistant Examiner* — Wenwen Cai
(74) *Attorney, Agent, or Firm* — Westerman, Hattori, Daniels & Adrian, LLP

(57) ABSTRACT

A pigment dispersion of the present invention includes a bisacetoacetarylide pigment (a); a styrene-acrylic acid-based copolymer (b); a basic compound (c); and a wetting agent (d), wherein the wetting agent (d) includes at least one diol compound (e), the diol compound (e) is selected from the group consisting of dipropylene glycol, 2-ethyl-1,3-hexanediol, and 1,2-hexanediol
the mass ratio (e)/(a) of the diol compound (e) and the bisacetoacetarylide pigment (a) is within a range from 3/100 to 8/100.

7 Claims, No Drawings

PIGMENT DISPERSION, AQUEOUS PIGMENT LIQUID DISPERSION, AND INK-JET RECORDING INK

TECHNICAL FIELD

The present invention relates to a pigment dispersion that includes a yellow pigment for an ink, to an aqueous pigment liquid dispersion prepared by dispersing the pigment dispersion in an aqueous medium and a production process thereof, and to an ink-jet recording ink that includes, as a main component, the aqueous pigment liquid dispersion.

BACKGROUND ART

Aqueous inks have become the major ink for an ink-jet recording use other than an industrial use because the danger of fire breaking and toxicity such as mutagenicity, which are major problems of oil-based inks, can be reduced.

However, a pigment-containing ink, which is used as an ink-jet recording aqueous ink, has the significant problem of nozzle clogging due to the aggregation/sedimentation of pigments although they are advantageous in that good light fastness is prepared. Sedimentation of pigments caused from aggregation results in the serious problems such as reduction in yield and destabilization of quality even in a production process of an aqueous pigment liquid dispersion that is an intermediate of an ink.

In order to improve this, various methods have been investigated, which use polymer-based dispersants to disperse pigments in an aqueous medium. However, it is generally difficult to stably disperse pigments over a long period only with polymer-based dispersants. In particular, there are only a few yellow pigments that are excellent in light fastness, and it is difficult to produce, by using limited types of a pigment, an aqueous pigment liquid dispersion and an ink-jet recording aqueous ink which are excellent in both light fastness and dispersion stability.

In view of such situation, the present applicant previously proposed an aqueous pigment liquid dispersion that contains Pigment Yellow 155, i.e. a bisacetoacetarylide pigment, and uses a styrene-acrylic acid-based copolymer as a dispersant (Patent Reference 1).

However, the aqueous pigment liquid dispersion obtained in Patent Reference 1 has the problem that the sedimentation of pigments cannot be sufficiently suppressed when it is used as an ink-jet ink that requires good discharging properties at a low viscosity although it has excellent color developing and light fastness that are peculiar to Pigment Yellow 155. Furthermore, in order to accept the demand for photograph image quality of high luster in recent years, higher luster needs to be realized, and these improvements have been strongly desired.

Meanwhile, the production process is disclosed, in which dispersion is performed under the presence of a diol compound when the pigment is dispersed in a liquid medium (Patent Reference 2). When this production process is used, it is said that a large dot diameter can be formed on a recording medium with a small discharging quantity. However, in the production process disclosed in Patent Reference 2 which includes no kneading step, since coating of pigments with resins is not sufficiently performed, the effects of anti-sedimentation and luster improvement were not obtained, and the problems such as the increase in viscosity due to free resins were likely to occur on the contrary.

[Patent Reference 1]
Japanese Unexamined Patent Application, First Publication No. 2005-060419

[Patent Reference 2]
Japanese Unexamined Patent Application, First Publication No. 2004-002698 (Example B2)

DISCLOSURE OF INVENTION

Objects of the present invention is to provide an aqueous pigment liquid dispersion having a yellow color, in which the dispersion stability is excellent, the sedimentation is small even at a low viscosity, and the luster is excellent when it is used as a main component of an ink-jet recording ink; and a pigment dispersion with which the aqueous pigment liquid dispersion can be easily produced.

The present inventors have intensively performed their investigation in order to solve the aforementioned objects, and then found the following and completed the present invention. In order to efficiently coat the surface of a bisacetoacetarylide pigment with the resins of a styrene-acrylic acid-based copolymer, it is effective to knead the particles of a bisacetoacetarylide pigment in the coexistence with a styrene-acrylic acid-based copolymer, a basic compound, and a wetting agent containing a specified diol compound so as to produce a pigment dispersion.

In other words, the present invention provides a pigment dispersion including:
a bisacetoacetarylide pigment (a); a styrene-acrylic acid-based copolymer (b); a basic compound (c); and a wetting agent (d), wherein
the wetting agent (d) comprises a diol compound (e),
the diol compound (e) is a compound represented by a general formula (1) A-B (1)

(In the formula, A represents a straight-chain or branched alkyl group whose main chain has 2 or more carbon atoms, and B represents a straight-chain or branched dihydroxyalkyl group whose main chain has 2 or more carbon atoms, in which the total of the carbon atoms in the main chains of A and B is 5 or more, and the total of the carbon atoms in A and B is within a range from 5 to 10.)
or a general formula (2)

$$C-O-D \qquad (2)$$

(In the formula, C and D represent a straight-chain or branched monohydroxyalkyl group whose main chain has 2 or more carbon atoms, in which the total of the carbon atoms in the main chains of C and D is 5 or more, and the total of the carbon atoms in C and D is within a range from 5 to 10.), and the mass ratio (e)/(a) between the diol compound (e) and the bisacetoacetarylide pigment (a) is within a range from 3/100 to 15/100.

Also, the present invention provides an aqueous pigment liquid dispersion produced by dispersing the aforementioned pigment dispersion in an aqueous medium.

In addition, the present invention provides a process for producing a pigment dispersion, including:
a kneading step of kneading a mixture including a bisacetoacetarylide pigment (a); a styrene-acrylic acid-based copolymer (b); a basic compound (c); and a wetting agent (d), wherein
the wetting agent (d) comprises a diol compound (e),
the diol compound (e) is a compound represented by a general formula (1)

$$A-B \qquad (1)$$

(In the formula, A represents a straight-chain or branched alkyl group whose main chain has 2 or more carbon atoms, and B represents a straight-chain or branched dihydroxyalkyl group whose main chain has 2 or more carbon atoms, in which the total of the carbon atoms in the main chains of A and B is 5 or more, and the total of the carbon atoms in A and B is within a range from 5 to 10.)

or a general formula (2)

$$C\text{—}O\text{-}D \quad (2)$$

(In the formula, C and D represent a straight-chain or branched monohydroxyalkyl group whose main chain has 2 or more carbon atoms, in which the total of the carbon atoms in the main chains of C and D is 5 or more, and the total of the carbon atoms in C and D is within a range from 5 to 10.), and the mass ratio (e)/(a) between the diol compound (e) and the bisacetoacetarylide pigment (a) is within a range from 3/100 to 15/100 in the kneading step.

Also, the present invention provides a process for producing an aqueous pigment liquid dispersion, including dispersing the pigment dispersion produced using the production process of the pigment dispersion in an aqueous medium, to thereby produce a liquid dispersion.

In addition, the present invention also provides an ink-jet recording ink that contains, as the main component, the aforementioned aqueous pigment liquid dispersion, and a production process thereof.

A pigment dispersion of the present invention is easy to handle as a solid pigment dispersion or modified pigment that includes a highly-concentrated bisacetoacetarylide pigment, and it is possible to easily produce an aqueous pigment liquid dispersion by dispersing, in an aqueous medium, the pigment dispersion alone or in combination with other colorants, etc. In an aqueous pigment liquid dispersion of the present invention, which is produced through a kneading step to produce the aforementioned pigment dispersion and a dispersion step of dispersing the pigment dispersion in an aqueous medium, the pigments are microparticulated, and the pigment surface is well coated with resins. Therefore, this aqueous pigment liquid dispersion has so good dispersion stability that the sedimentation of the pigments rarely occurs in an aqueous medium. Also, an ink-jet recording ink, which contains the aforementioned aqueous pigment liquid dispersion as the main component, has the same dispersion stability as the aqueous pigment liquid dispersion, which is good enough that the sedimentation of the pigments rarely occurs in an aqueous medium. In addition, this ink-jet recording ink can form an image that is excellent in luster and light fastness and can be preservable over a long period.

BEST MODE FOR CARRYING OUT THE INVENTION

Hereinafter, each of the constituents of a pigment dispersion of the present invention is described in detail.

The bisacetoacetarylide pigment (a) used in the present invention has the structures represented by the following general formula (3) or (4).

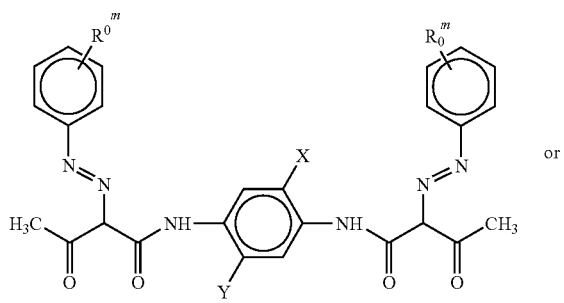

(3)

or

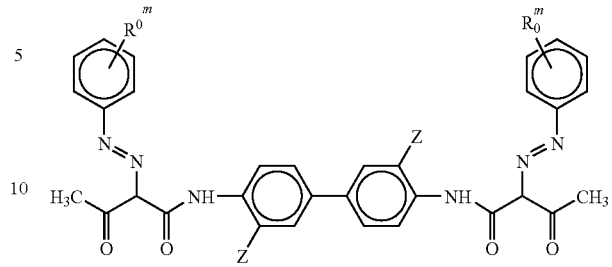

(4)

(In the formula, Ro independently represents any of $CH_3$, $OCH_3$, $OC_2H_5$, Cl, Br, $NO_2$, and $COOCH_3$, and m represents 0 to 3. Also, X and Y each independently represents H, $CH_3$, $OCH_3$, and Cl, and Z represents $CH_3$, $OCH_3$, and Cl.)

Examples of the pigments represented by the general formulas (3) and (4) include C.I. Pigment Yellow 155, C.I. Pigment Yellow 16, and C.I. Pigment Yellow 98.

In particular, C.I. Pigment Yellow 155 represented by the following chemical formula (5) is preferred in terms of color-developing properties and durability.

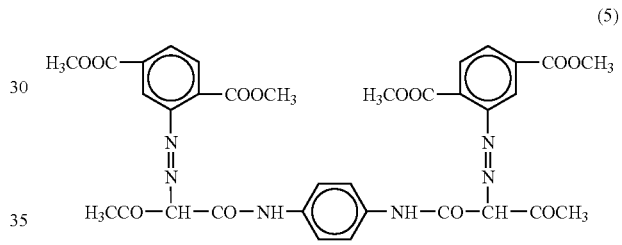

(5)

The particle diameter of C.I. Pigment Yellow 155, which is an average particle diameter obtained by the observation with an electron microscope, is preferably 200 nm or less, and more preferably 150 nm or less. When the particle diameter exceeds 200 nm, good luster cannot be obtained, and the discharging property of an ink tends to be deteriorated. Herein, the particle diameter of a pigment is obtained by measuring, with electron micrographs, one hundred of the longitudinal diameter component of each pigment particle and calculating the average value thereof.

The styrene-acrylic acid-based copolymer (b) used in the present invention includes, as constituent monomers, a styrene-based monomer and at least one of acrylic acid and methacrylic acid, and preferably includes all of a styrene-based monomer, acrylic acid, and methacrylic acid. In the composition ratio of the constituent monomers of the styrene-acrylic acid-based copolymer (b), the ratio of a styrene-based monomer unit to the total quantity of all the monomer units is preferably 60 mass % or more, and more preferably within a range from 60 to 90 mass %. In particular, the sum of a styrene-based monomer unit, an acrylic acid monomer unit, and a methacrylic acid monomer unit is preferably 95 mass % or more in the total quantity of all the monomer units.

When the styrene-acrylic acid-based copolymer (b) in the present invention contains a highly-concentrated styrene-based monomer of 60 mass % or more, the copolymers can well adsorb to the pigment surface that is rich in hydrophobic components, and the dispersion property of the pigments can be well maintained. In particular, in a production process of the present invention, the copolymers strongly adsorb to the surface of a bisacetoacetarylide pigment, particularly Pigment Yellow 155, and the dispersion property is maintained so stably that the sedimentation rarely occurs in comparison with the case where another pigment is used. Furthermore, when a styrene-based monomer unit is contained at 60 mass % or more, excellent plain paper recording properties and high image recording density can be obtained by using the resultant ink-jet recording ink. Also, the water resistance of a printed image is good. Moreover, when the proportion of a styrene-based monomer unit is within a range from 60 to 90 mass %, the good solubility of the styrene-acrylic acid-based copolymer (b) in an aqueous medium can be maintained, and the dispersion property and the dispersion stability of the pigment in the aqueous pigment liquid dispersion can be improved. As a result, excellent printing stability can be obtained when the ink-jet recording ink is used.

The acid value of the styrene-acrylic acid-based copolymer (b) used in an aqueous pigment liquid dispersion of the present invention is within a range from 100 to 200 mgKOH/g, and preferably from 120 to 180 mgKOH/g. When the acid value is 100 mgKOH/g or more, sufficient hydrophilicity is obtained. Therefore, when an ink-jet recording ink is produced, the reaggregation of the pigments in the composition is difficult to occur, and the stable dispersion can be obtained. Meanwhile, when the acid value is 200 mgKOH/g or less, the copolymer can have appropriate hydrophilicity. Therefore, the adsorption to the hydrophobic pigment surface is well maintained, and the high water resistance of an ink-printed matter can be maintained when an ink is produced and an image is formed on a matter to be printed.

As a styrene-based monomer unit which constitutes the styrene-acrylic acid-based copolymer (b) used in the present invention, a known compound can be used. Examples thereof include an alkylstyrene such as styrene, α-methylstyrene, β-methylstyrene, 2,4-dimethylstyrene, α-ethylstyrene, α-butylstyrene, or α-hexylstyrene; a halogenated styrene such as 4-chlorostyrene, 3-chlorostyrene, or 3-bromostyrene; 3-nitrostyrene; 4-methoxystyrene; and vinyltoluene.

Among these styrene-based monomers, an alkylstyrene monomer is preferably used, and a styrene monomer is most preferably used.

The styrene-acrylic acid-based copolymer (b) may contain a monomer other than a styrene-based monomer, an acrylic acid, and a methacrylic acid, which is polymerizable with these monomers. The content of this monomer is lower than 5 mass % as a component quantity. Examples thereof include (meth)acrylic esters such as methyl (meth)acrylate, ethyl (meth)acrylate, n-propyl (meth)acrylate, isopropyl (meth)acrylate, n-butyl (meth)acrylate, sec-butyl (meth)acrylate, tert-butyl (meth)acrylate, 2-methylbutyl (meth)acrylate, 2-ethylbutyl (meth)acrylate, 3-methylbutyl (meth)acrylate, 1,3-dimethylbutyl (meth)acrylate, pentyl (meth)acrylate, hexyl (meth)acrylate, 2-ethylhexyl (meth)acrylate, heptyl (meth)acrylate, octyl (meth)acrylate, or nonyl (meth)acrylate; (meth)acrylic ester derivatives such as 2-ethoxyethyl acrylate, 3-ethoxypropyl acrylate, 2-ethoxybutyl acrylate, 3-ethoxybutyl acrylate, dimethylaminoethyl (meth)acrylate, hydroxyethyl (meth)acrylate, hydroxypropyl (meth)acrylate, hydroxybutyl (meth)acrylate, ethyl-α-(hydroxymethyl)acrylate, or methyl-α-(hydroxymethyl)acrylate; aryl (meth)acrylic esters and aralkyl (meth)acrylic esters such as phenyl (meth)acrylate, benzyl (meth)acrylate, or phenylethyl (meth)acrylate; polyhydric alcohol such as diethylene glycol, triethylene glycol, polyethylene glycol, glycerin, or bisphenol A; and mono(meth)acrylic esters of polyhydric phenol; and dialkyl maleic ester such as dimethyl maleate or diethyl maleate. One, or two or more of these monomers can be added as monomer components.

The styrene-acrylic acid-based copolymer (b) used in the present invention has the weight average molecular weight within a range from 6,000 to 40,000. The weight average molecular weight is preferably within a range from 7,500 to 30,000, and more preferably within a range from 7,500 to 14,000. When the weight average molecular weight is lower than 6,000, the coating of the pigment tends to be insufficient although it is easy to microparticulate the dispersed particles in the beginning of the formation of an aqueous pigment liquid dispersion. Also, sedimentation tends to occur, and sufficient luster tends not to be shown.

When the weight average molecular weight of the styrene-acrylic acid-based copolymer (b) exceeds 40,000, the viscosity of the ink-jet recording ink, which is prepared from the aqueous pigment liquid dispersion using the styrene-acrylic acid-based copolymer (b), tends to increase, and the discharging stability of the ink tends to deteriorate.

The styrene-acrylic acid-based copolymer (b) used in the present invention may be any of a random copolymer, a block copolymer, and a graft copolymer. An example of a graft copolymer is a graft copolymer in which polystyrene or the copolymer of styrene and a nonionic monomer, which is copolymerizable with styrene, forms a stem or a branch and a copolymer of acrylic acid or methacrylic acid, and another monomer including styrene forms a stem or a branch. The styrene-acrylic acid-based copolymer (b) may be the mixture of the aforementioned copolymer and a random copolymer.

In a pigment dispersion of the present invention, the mass ratio (b)/(a) between the styrene-acrylic acid-based copolymer (b) and the bisacetoacetarylide pigment (a) is preferably within a range from 10/100 to 40/100, and particularly preferably from 18/100 to 30/100. When the mass ratio (b)/(a) is lower than 10/100, the dispersion stability of the obtained aqueous pigment liquid dispersion deteriorates, and the rub resistance tends to deteriorate in the case where an ink-jet recording ink is prepared by using the aqueous pigment liquid dispersion. When the mass ratio (b)/(a) exceeds 40/100, the viscosity of the ink-jet recording ink becomes so high that the discharging stability tends to deteriorate. In order to well maintain high-temperature preservation stability in consideration of the use of a thermal jet type ink-jet recording ink, it is particularly important to adjust the mass ratio (b)/(a) within the aforementioned range.

The styrene-acrylic acid-based copolymer (b) is used in the coexistence with the basic compound (c) in order to neutralize the acrylic acid part thereof. The basic compound (c) softens the resins in the kneading step so as to facilitate the coating process of the pigment with the resins, and improves the dispersion property of the pigment coated with the resins in an aqueous medium. As the basic compound (c), any of an inorganic basic compound and an organic basic compound can be used. Examples of an organic basic compound include amines such as methylamine, dimethylamine, trimethylamine, ethylamine, diethylamine, and triethylamine; and alcoholamines such as triethanolamine, diethanolamine, and methyldiethanolamine. Examples of an inorganic basic compound include the hydroxides of alkali metals such as potassium and sodium; the carbonates of alkali metals such as potassium and sodium; the carbonates of alkali earth metals, etc. such as calcium and barium; and ammonium hydroxide.

In particular, alkali metal hydroxides and alcoholamines are preferred in terms of a dispersion property, preservation stability, the decapping property of an ink-jet printer, and the water resistance of a printed matter when a pigment dispersion of the present invention is used to prepare an aqueous pigment liquid dispersion, and further an ink-jet recording ink. Among these basic compounds, alkali metal hydroxides as typified by potassium hydroxide, sodium hydroxide, and lithium hydroxide contribute the decrease in the viscosity of an aqueous pigment liquid dispersion, and are preferred in terms of the discharging stability of an ink-jet recording ink. In particular, potassium hydroxide is preferred.

Moreover, the alkali metal hydroxide is preferably used in an aqueous solution, and the addition amount thereof is preferably adjusted so that the neutralization percentage is within a range from 80% to 120% on the basis of the acid value of the styrene-acrylic acid-based copolymer (b). The neutralization percentage is preferably set to be 80% or higher in terms of the improvement of the dispersion rate in an aqueous medium when an aqueous pigment liquid dispersion is produced using a pigment dispersion, and the dispersion stability and the preservation stability of an aqueous pigment liquid dispersion. Also, the neutralization percentage is preferably set to be 120% or lower in terms of the prevention of gelation during long-term preservation of an aqueous pigment liquid dispersion or an ink-jet recording ink, and the water resistance of the printed matter produced by using the ink.

In the present invention, the neutralization percentage means the value which indicates the percentage of the alkali metal hydroxide added in comparison with the amount required to neutralize all the carboxyl groups in the styrene-acrylic acid-based copolymer (b), and is calculated by the following equation.

Neutralization Percentage(%)=((Mass of Basic Compound(g)×56×1,000)/(Acid Value of Resin×Equivalent Quantity of Basic Compound×Quantity of Resin(g)))×100

The diol compound (e), which is included as an essential component in the wetting agent (d), is represented by a general formula (1)

A-B    (1)

(In the formula, A represents a straight-chain or branched alkyl group whose main chain has 2 or more carbon atoms, and B represents a straight-chain or branched dihydroxyalkyl group whose main chain has 2 or more carbon atoms, in which the total of the carbon atoms in the main chains of A and B is 5 or more, and the total of the carbon atoms in A and B is within a range from 5 to 10.)

or a general formula (2)

C—O-D    (2)

(In the formula, C and D represent a straight-chain or branched monohydroxyalkyl group whose main chain has 2 or more carbon atoms, in which the total of the carbon atoms in the main chains of C and D is 5 or more, and the total of the carbon atoms in C and D is within a range from 5 to 10.).

When an aqueous pigment liquid dispersion or an ink-jet recording ink is produced using the pigment dispersion, the diol compound (e) in the wetting agent (d) used in the present invention functions not only as a wetting agent but also as a dispersion assistant for bisacetoacetarylide pigments so as to prevent the sedimentation thereof. In the diol compound represented by the general formula (1) or (2), the total of the carbon atoms of the main chains is 5 or more, and the total of the carbon atoms is within a range from 5 to 10.

When the total of the carbon atoms in the main chains is 4 or less, the anti-sedimentation effect cannot be obtained. When the total of the carbon atoms is 11 or more, the viscosity of the diol compound tends to increase, which causes the deterioration of the discharging property of the ink-jet recording ink to be formed. Also, the anti-sedimentation effect tends to deteriorate.

In the diol compound represented by the general formula (1) or (2), it is preferable that the carbon atoms of the main chains be 6 or more and the total of the carbon atoms be within a range from 6 to 9, and it is particularly preferable that the carbon atoms of the main chains be 6 or more and the total of the carbon atoms be within a range from 6 to 8 in terms of the microparticulation and the anti-sedimentation of the bisacetoacetarylide pigments.

In the diol compound represented by the general formula (1), both of the hydroxyl groups of B, which represents a dihydroxyalkyl group, are preferably bonded to the carbon atoms of the main chain, more preferably to the carbon atoms at different positions selected from among 1-position, 2-position, 3-position, and 4-position, and particularly preferably to the carbon atoms at different positions selected from among 1-position, 2-position, and 3-position.

Also, A, which represents an alkyl group, preferably represents a straight-chain alkyl group.

In terms of the microparticulation and the anti-sedimentation, the diol compound represented by the general formula (1) is more preferably 2-ethyl-1,3-hexanediol or 1,2-hexanediol, and most preferably 1,2-hexanediol.

In the diol compound represented by the general formula (2), the hydroxyl groups of C and D is preferably bonded to the carbon atoms of the main chain, and it is particularly preferable that C and D represent a straight-chain monohydroxyalkyl group. In terms of the microparticulation during the formation of the pigment dispersion of the bisacetoacetarylide pigment (a) and the anti-sedimentation during the dispersion of the pigment dispersion in an aqueous medium, each of C and D in the diol compound represented by the general formula (2) preferably represents a monohydroxyalkyl group having 3 carbon atoms, and most preferably dipropylene glycol.

Accordingly, the diol compound used in the present invention is preferably at least one diol compound selected from the group consisting of dipropylene glycol, 2-ethyl-1,3-hexanediol, and 1,2-hexanediol. Especially when diethylene glycol is used as the wetting agent (d), it is preferable to use at least one diol compound selected from the aforementioned group.

These 3 types of diol compounds included in the pigment dispersion have the effect on the microparticulation of the pigments in the ink and the anti-sedimentation of the pigments in the aqueous pigment liquid dispersion in the aqueous pigment liquid dispersion when the aqueous pigment liquid dispersion and the ink-jet recording ink are produced by using the pigment dispersion. Of these, dipropylene glycol is preferred in terms of the fineness of the average particle diameter of the aqueous pigment liquid dispersion. Meanwhile, 1,2-hexanediol has been used as a very conventional penetrant in the production of an ink-jet recording ink, and is preferred because it has little negative effect on the properties of an ink-jet recording ink and simultaneously has the effect on the permeability of an ink.

it is generally preferable that the diol compound, which is the same as that used for the adjustment, be used for producing the pigment dispersion that is further used to produce the ink, because it is possible to reduce the effect on the other properties of the ink.

When one or more of the aforementioned diol compounds are additionally added for the adjustment of the ink-jet recording ink in the production of the ink, it is generally preferable that the diol compound, which is the same as that used for the adjustment, be used for producing the pigment dispersion that is further used to produce the ink, because it is possible to reduce the effect on the other properties of the ink. Regarding the addition quantity of the diol compound, the mass ratio (e)/(a) between the diol compound (e) and the bisacetoacetarylide pigment (a) is within a range from 3/100 to 15/100. When the mass ratio (e)/(a) is beyond the aforementioned range, the balance between hydrophobicity and hydrophilicity of the pigment surface becomes inappropriate in the production of the pigment dispersion, and the interaction between the bisacetoacetarylide pigment (a) and the styrene-acrylic acid-based copolymer (b) becomes insufficient. For these reasons, the coating of the pigment surface with the styrene-acrylic acid-based copolymer does not proceed well. Therefore, the pigment dispersion cannot be obtained, which can be used to produce the aqueous pigment liquid dispersion and the ink-jet recording ink in which the dispersion property is good and the sedimentation of the pigments does not occur.

As the wetting agent (d), the compound other than the diol compound (e) can be simultaneously used. By simultaneously using the wetting agent (d) other than the diol compound (e), the optimal solid content can be freely set in the production of the pigment dispersion regardless of the aforementioned optimal quantity of the diol compound.

As the usable wetting agent (d) other than the diol compound (e), known conventional wetting agents can be used, and examples thereof include polyols such as glycerin, ethylene glycol, diethylene glycol, triethylene glycol, tetraethylene glycol, polyethylene glycol, propylene glycol, polypropylene glycol, 1,3-propanediol, 1,4-butanediol, 1,5-pentanediol, 1,6-hexanediol, 1,2,6-hexanetriol, trimethylolpropane, or pentaerythritol; lactams such as 2-pyrrolidone, N-methyl-2-pyrrolidone, c-caprolactam; and 1,3-dimethylimidazolidine. Of these, diethylene glycol is preferred. These wetting agents (d) have high boiling points so that they are not evaporated in the kneading step, and the stable condition of the kneading step is maintained. Besides, since the wetting agent (d) is intrinsically a part of the ink-jet recording ink, there is no need for removing when the aqueous pigment liquid dispersion or the ink-jet recording ink is produced, and it is possible to easily produce them.

The mass ratio (d)/(a) between the wetting agent (d) and the bisacetoacetarylide pigment (a) is preferably within a range from 16/100 to 35/100 in order to efficiently perform the good kneading step in which sufficient shear force occur so as to produce the pigment dispersion that can be used to form the aqueous pigment liquid dispersion and the ink-jet recording ink in which the pigments are microparticulated and the dispersion stability is good.

The aqueous pigment liquid dispersion of the present invention can be produced by dispersing the aforementioned pigment dispersion in water or an aqueous medium that has water as a main component. As the aqueous medium, water as well as the mixture containing water and a wetting agent can be preferably used, and the quantity thereof can be adjusted in consideration of the anti-evaporation effect of the wetting agent in the aqueous pigment liquid dispersion and the viscosity, etc. The pigment content in the aqueous pigment liquid dispersion is preferably within a range from 1 to 30 mass %, and more preferably from 10 to 20 mass % in consideration of the good printing density and the discharging property of the ink-jet recording ink to be formed.

The ink-jet recording ink of the present invention can be produced by adding, to the aforementioned aqueous pigment liquid dispersion, an aqueous medium as well as additives such as a wetting agent, a penetrant, an antiseptic agent, an antibacterial agent, a surfactant, an antifoamer, an antioxidant, and an ultraviolet absorber, and by adjusting the pigment content and the viscosity.

Hereinafter is a detailed description of processes for producing a pigment dispersion and an aqueous pigment liquid dispersion of the present invention.

The aforementioned pigment dispersion can be produced by the following process, for example.

A process for producing a pigment dispersion of the present invention, including:
a kneading step of kneading a mixture including a bisacetoacetarylide pigment (a); a styrene-acrylic acid-based copolymer (b); a basic compound (c); and a wetting agent (d), wherein
the wetting agent (d) comprises a diol compound (e),
the diol compound (e) is a compound represented by a general formula (1)

(In the formula, A represents a straight-chain or branched alkyl group whose main chain has 2 or more carbon atoms, and B represents a straight-chain or branched dihydroxyalkyl group whose main chain has 2 or more carbon atoms, in which the total of the carbon atoms in the main chains of A and B is 5 or more, and the total of the carbon atoms in A and B is within a range from 5 to 10.)
or a general formula (2)

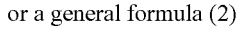

(In the formula, C and D represent a straight-chain or branched monohydroxyalkyl group whose main chain has 2 or more carbon atoms, in which the total of the carbon atoms in the main chains of C and D is 5 or more, and the total of the carbon atoms in C and D is within a range from 5 to 10.), and
the mass ratio (e)/(a) between the diol compound (e) and the bisacetoacetarylide pigment (a) is within a range from 3/100 to 15/100 in the kneading step.

In the kneading step within the process for producing the pigment dispersion, when the mixture is kneaded, which includes the bisacetoacetarylide pigment (a), the styrene-acrylic acid-based copolymer (b), the basic compound (c), and the wetting agent (d) containing the aforementioned diol compound (e) at the specified quantity, the diol compound (e) does not only adjust the solid content of the mixture during the kneading, but also functions as a dispersion assistant for the bisacetoacetarylide pigment (b), to thereby well assist the progress of the coating of the surface of the bisacetoacetarylide pigment (b) with the styrene-acrylic acid-based copolymers (b).

In this case, it is important to perform the kneading under the condition that the solid content is high enough for large shearing force to be applied, and to perform the crushing of the pigments and the mixing/homogenization of the pigments and the resins. Under such condition, the pigment particles are aggregated in the presence of the resins to form one piece of lump, and the kneading is carried on. Then, the sufficient shearing force from a kneading machine is applied to the mixture, and the styrene-acrylic acid-based copolymer (b), which is swollen by the wetting agent (d) in the presence of the basic compound (c), can be spread on the pigment surface so as to efficiently coat the particle interface of the bisacetoacetarylide pigment (a).

Regarding the quantity of the wetting agent (d) in the kneading step within the process for producing the aqueous pigment liquid dispersion of the present invention, the mass ratio (d)/(a) between the wetting agent (d) and the bisacetoacetarylide pigment (a) is preferably within a range from 16/100 to 35/100. When the mass ratio (d)/(a) is lower than the aforementioned range, the pigment particles tend not to form one piece of lump sufficiently, and the efficiency of the kneading step that is first performed using powders tends to deteriorate. When the mass ratio (d)/(a) is higher than 35/100, the mixture tends to be in a liquid form or similar form thereto, and the styrene-acrylic acid-based copolymer (b) that is a water-soluble resin component tends to be transferred to the liquid phase. Therefore, the coating of the particle surface with the copolymers tends to be insufficiently performed. In addition, when the mass ratio (d)/(a) is higher than the aforementioned range, since the pigment particles tend to be dispersed in the liquid phase, the sufficient shearing force tends not to be applied to the pigment, and the kneading operation for solid materials, which is intended by the present invention, tends to be inefficiently performed. Herein, the optimal range of the aforementioned ratio (d)/(a) slightly varies according to the kneading temperature, and there is general tendency that the smaller quantity of the wetting agent (d) is required at a higher temperature. However, the aforementioned range can be applied at a usual kneading temperature range without any problem.

In the kneading step within the process for producing the pigment dispersion, it is preferable to simultaneously use the wetting agent (d) other than the diol compound (e) for the adjustment of the solid content of the material to be kneaded, because it is possible to independently perform the adjustment of the optimal quantity of the diol compound (e) for the anti-sedimentation of the pigments and the adjustment of the optimal solid content during the kneading. The specified quantity for the diol compound (e) is usually small as the quantity of the wetting agent (d) required in the kneading step to produce the pigment dispersion of the present invention. Therefore, it is preferable to simultaneously use the wetting agent (d) other than the diol compound (e).

When the styrene-acrylic acid-based copolymers (b) stay on the surface of the bisacetoacetarylide pigment (a) so sufficiently as to coat it, it is possible to obtain the sufficient anti-sedimentation effect in the production of the ink-jet recording ink and the excellent luster of the image formed by printing with the ink. However, when the quantity of the styrene-acrylic acid-based copolymer (b) is so large that they are diffused into the aqueous medium, the viscosity of the ink tends to increase, and the discharging property tends to deteriorate.

The mass ratio (b)/(a) between the styrene-acrylic acid-based copolymer (b) and the bisacetoacetarylide pigment (a) is preferably set within a range from 10/100 to 40/100. When the quantity of the styrene-acrylic acid-based copolymer (b) is set within the aforementioned range, the crushing of the pigments efficiently proceed. In addition, when the aqueous pigment liquid dispersion is formed, there is no extra resin that does not adsorb to the pigment and is present in the aqueous medium, which causes the increase in the viscosity of the liquid dispersion and the deterioration of the discharging property of the ink-jet recording ink.

When the alkali metal hydroxide is used as the basic compound (c), this is generally used in an aqueous solution. The quantity of water is preferably as small as possible, and this quantity is preferably reduced to 15 mass % or less in comparison with the pigment quantity, and more preferably to 8 mass % or less. In the present invention, the viscosity of the aqueous liquid dispersion is preferably 5.5 mPa·s or less, and more preferably 4.0 mPa·s or less.

For the efficient kneading, the solid content of the colored kneaded material during the kneading is preferably within a range of 50 to 80 mass %. Within this range, the dilution and dispersion of the colored kneaded material into the aqueous medium tend to proceed immediately even after the kneading. When the solid content exceeds 80 mass %, the dilution and dispersion after the kneading tend to require a long time. When the solid content is less than 50 mass %, the strong shearing force during the kneading tends to rarely occur.

Before the beginning of the kneading, the styrene-acrylic acid-based copolymer (b), the basic compound (c), the wetting agent (d), and the diol compound (e) are added to the powders of the bisacetoacetarylide pigment (a), to thereby prepare the mixture. It is preferable that the bisacetoacetarylide pigment (a) and the powders of the styrene-acrylic acid-based copolymer (b) are preliminarily mixed to form the powder mixture. To this powder mixture, the other essential components of the basic compound (c), the wetting agent (d), and the diol compound (e) are added, and then the kneading begins. A kneading machine preferably has capability of producing a shear force that is large enough for the effective kneading of the solid material. As a simple kneading method, there is the method of kneading the solid mixture using such a vessel as typified by a mortar or bowl made of stone or metal, with a pestle or beetle. In particular, a mortar and a pestle can be used especially for small-scale production. Even with the aforementioned kneader, the crushing of the pigments and the coating of the pigment surface with the resins are almost completed by performing the kneading operation for 30 minutes. Therefore, the solid colored kneaded material having the properties excellent in reproducibility can be produced. In the case of the accurate control of temperature or large-scale production, a conventional kneading machine having a roll or an agitating blade can be used. Of these, a press kneader, a henschel mixer, and a planetary mixer, which have an agitating tank and an agitating blade, are preferred, and moreover, a kneading machine, in which an agitating blade can rotate and revolve, is preferable. Representative examples thereof include a press kneader and a planetary mixer, and the latter is particularly preferred because the applicable viscosity region is broad and the kneading temperature can be decreased to a low temperature. A planetary mixer means a planetary-typed kneading machine, and is a generic term of kneading machines that have an agitating blade performing sun-and-planet motion (hereinafter, referred to as a "planetary mixer").

The bisacetoacetarylide pigments (a), which are a main component of the mixture obtained by adding the aforementioned components, aggregate each other through the styrene-acrylic acid-based copolymers (b) after a lapse of 2 to 20 minutes. With the progress of the aggregation, the bisacetoacetarylide pigments (a) become one piece of lump, and the aggregate in the shape of a ball or a rod is obtained. The addition of the diol compound (e) imparts the effects that the time required for the aggregation is shortened, and the better kneading is efficiently performed.

When the added components become one piece of lump, the apparent volume of the pigment powder before the kneading significantly decreases. The percentage of shrinkage is about 60 vol %.

During the aggregation, the neutralization of the styrene-acrylic acid-based copolymers (b) by the basic compound (c) proceeds, which causes the increase in temperature due to the heat of neutralization. By using this exothermic heat to adjust the temperature within the aforementioned preferable range during the addition, it is possible to save the electric power required for the kneading.

The obtained lump containing the bisacetoacetarylide pigments (a) is the mixture in a solid state, and it is important that the mixture can be stretched by applying the sufficient shearing force with the various types of kneading machines in order to perform the good kneading. However, when the mixture in a solid state is too hard, the damage of a kneader may occur, and the negative effects of color phases and luster may also occur due to the destruction of the pigment particle.

For these reasons, the addition quantity of each of the components used in the kneading step is preferably set within the aforementioned range in order to efficiently perform the good kneading.

In order to apply the sufficient shearing force to the solid material during the kneading in the kneading step, the added components preferably become one piece of lump. In order to obtain the preferable condition for the kneading, the components other than the bisacetoacetarylide pigments (a) are preferably added not at one time but step-by-step.

When the pigment and the copolymer are kneaded in the coexistence with the surfactant in the kneading operation, the copolymer tends to be transferred into the liquid phase and to be eliminated from the pigment surface. Therefore, it is preferable that the surfactant does not coexist during the kneading.

The kneading time is not particularly limited, but is preferably within a range from 0.2 to 6 hours, and more preferably from 0.5 to 3 hours. When the kneading time is less than 0.2 hours, the coating of the pigment surface with the resins tends not to be completed. When the kneading time exceeds 6 hours, the productivity may deteriorate, and the destruction of the pigment may be induced, resulting in the changes of color phases and luster.

The pigment dispersion obtained in the aforementioned manner is a colored kneaded material that is solid at ordinary temperature which is easy to handle or store over a long period as a microcapsule-typed modified pigment in which the pigment surface is coated with the resins.

In the formation of the pigment dispersion of the present invention, a frequency of the kneading machine can be set appropriately, but the shearing force, must be strong enough to well knead the material to be kneaded during the kneading.

The effect due to the use of the specified diol compound (e) in the present invention is considered to be specific to the bisacetoacetarylide pigment (a). For example, as shown in Comparative Examples, the aforementioned effects are not found for Pigment Blue 15:3 and Pigment Red 168 which are different in the basic chemical structure from the bisacetoacetarylide pigment (a). Also, the aforementioned effects are not found for Pigment Yellow 213 which is different in the basic chemical structure and has many similar parts. In addition, the aforementioned effects of the present invention are not found for diol compounds other than the aforementioned diol compound (e) as shown in Comparative Examples.

This phenomenon can be explained in consideration of the surface properties of the bisacetoacetarylide pigment (a). The bisacetoacetarylide pigment (a) is an aromatic ring-rich ester compound. In the interaction between this pigment and the styrene-acrylic acid-based copolymer (b), the hydrophobic π-π interaction between the aromatic rings of the pigment and the aromatic rings of the styrene-based monomer that is a main monomer unit of the copolymer is considered to have a certain role. Meanwhile, the acrylic acid monomer component is essential in the styrene-acrylic acid-based copolymer (b) from the view of the use in an aqueous ink. However, this component imparts the only weak interaction with the ester part of the pigment surface, and eliminates the copolymers from the pigment surface on the contrary. Furthermore, the copolymers are transferred into coexistent water or the wetting agent (d) which has a lot of hydrogen bonds. The coexistence of the aforementioned diol compound (e) having a specified structure, in which the carbon atoms in the main chains is 5 or more, and the total of the carbon atoms is within a range from 5 to 10, is considered to contribute to the balance of hydrophobicity/hydrophilicity which is important for the adsorption of the copolymers to the pigment surface.

In the process for producing the aqueous pigment liquid dispersion of the present invention, the pigment dispersion produced using the aforementioned production process is dispersed in an aqueous medium, to thereby produce the aqueous pigment liquid dispersion. The step of kneading the mixture with a high solid content, which includes the bisacetoacetarylide pigment (a), the styrene-acrylic acid-based copolymer (b), the basic compound (c), and the diol compound (e), is one of the characters of the process for producing the aqueous pigment liquid dispersion of the present invention.

Therefore, it is preferable that the mixture does not become in a liquid state in the kneading step to produce the pigment dispersion. In a liquid state, at least one or all of the styrene-acrylic acid-based copolymers (b) are likely to diffuse into the liquid, and the copolymers tend not to sufficiently stay at the pigment surface. Therefore, the advantageous effects of the present invention such as the microparticulation and anti-sedimentation of the pigments are not obtained when the aqueous pigment solution is produced using only the pigment dispersion operation in a liquid, which has been conventionally performed, without the kneading of the mixture containing pigments and resins.

In the dispersion step within the process of producing the aqueous pigment liquid dispersion of the present invention, the solid colored kneaded material, which is the pigment dispersion produced through the kneading step, and water or the aqueous medium containing water as a main component are mixed, to thereby easily obtain the pigment liquid dispersion. In this step, the mixture can be further mixed with a colorant such as another dye, followed by the dispersion. The color phase of the pigment aqueous liquid dispersion can be adjusted to a greenish or reddish yellow color by the mixing with such colorant. The pigment surface of the bisacetoacetarylide pigment (a) is sufficiently coated with the styrene-acrylic acid-based copolymers (b) with improved hydrophilicity by the addition of the basic compound (c). In addition, the process of the coating proceeds well with the assistance of the diol compound (e). Therefore, the aqueous pigment liquid dispersion can be easily obtained, and particularly, the aqueous pigment liquid dispersion with homogenized fine pigment particles can be obtained without using a conventional pigment dispersion device. The mixing with the aqueous medium may be performed in a conventional agitator with an agitating blade and an agitating tank, or may be performed by directly agitating them in the aforementioned planetary mixer. The pigment content of the obtained liquid dispersion is preferably within a range from 1 to 30 mass %. When the pigment content range is below the aforementioned range, the printing density is insufficient. When the pigment content range exceeds the aforementioned range, the viscosity tends to be so high as to deteriorate the handling.

When the colored kneaded material, i.e. the pigment dispersion, is mixed with the aqueous medium and dispersed therein, a conventional dispersion device may be used for the improvement of the dispersion property or productivity. It is particularly effective to introduce the step using a media dispersion machine with beads, etc. This media dispersion machine can be used to obtain the homogeneity of the component content in the solution especially when the components other than water are added in the dispersion step. Examples of a media dispersion machine which is used in the dispersion step include a sand mill, a paint shaker, a ball mill, a sand grinder, DYNO-MILL, DISPERMAT, a SC mill, a spike mill, an agitator mill, and a pin mill.

However, as described above, the pigment dispersion step using the dispersion machine is not necessarily required in the present invention. When the dispersion machine is used, it is preferable that the dispersion time be limited within such a short time as 10 minutes, preferably 5 minutes, to prevent the excessive dispersion and the elimination of the resins on the pigment surface. When the dispersion machine is used in the dispersion step, the colored kneaded material produced in the kneading step is preferably mixed with the aqueous medium and diluted therewith, to thereby adjust the appropriate viscosity for the dispersion machine. It is preferable that the viscosity be reduced to 15 mPa·s or less.

As the mixing method of the aqueous medium in the dispersion step with proper stirring, the colored kneaded material and the aqueous medium may be mixed at one time or step-by-step, but by using the latter method, it is possible to more efficiently produce the aqueous pigment liquid dispersion with the better dispersion property. The temperature during the mixing is not particularly limited, but is preferably within a range from 5° C. to 70° C. The pigment content of the aqueous pigment liquid dispersion formed after the dispersion step is preferably within a range from 10 to 20 mass %. The liquid dispersion with a pigment content of about 1% to 7% is subjected to the adjustments of the viscosity and the pigment content by adding the aforementioned additives, and then is used as the ink-jet recording ink. Alternatively, the aforementioned liquid dispersion can be directly used as the ink-jet recording ink.

Moreover, the aqueous pigment liquid dispersion with a high pigment content can be used as the long-life intermediate for the ink-jet recording ink. For example, this aqueous pigment liquid dispersion is stored once, and then, water, conventional ink components, other pigment liquid dispersions, or dyes are added thereto so as to produce the ink-jet recording ink.

In the present invention, the second step (dispersion step) may be followed by a centrifugal separation step or a filtration step in order to reduce coarse particles in the liquid dispersion. The coarse particles that deteriorate luster can be reduced by using the coarse particle removal step In order to produce an ink-jet recording aqueous ink by using the aqueous pigment liquid dispersion of the present invention, the aforementioned aqueous pigment liquid dispersion is further diluted with an aqueous medium. It is preferable that a wetting agent be blended in the aqueous medium which dilutes the aqueous pigment liquid dispersion because it contributes to dry-prevention, viscosity adjustment, and density adjustment. Examples of the wetting agent are the same as the ones used in the kneading step to produce the pigment dispersion. For the purpose of preventing drying, the wetting agent content within the ink is preferably within a range from 3 to 50 mass %.

When an ink-jet recording ink is prepared, a penetrant may be added to improve the penetration of the ink into the recording medium and regulate the dot diameter on the recording medium. Examples of the penetrant include lower alcohols such as ethanol and isopropyl alcohol; ethylene oxide additives of alkyl alcohols such as ethylene glycol hexyl ether and diethylene glycol butyl ether; and propylene oxide additives of alkyl alcohols such as propylene glycol propyl ether. The penetrant content within the ink is preferably within a range from 0.01 to 10 mass %.

When an ink-jet recording ink is prepared, a surfactant may also be added to adjust the ink properties such as surface tension. There are no particular restrictions on the surfactant that can be added for the purpose, and examples include all manner of anionic surfactants, nonionic surfactants, cationic surfactants and amphoteric surfactants. Of these, anionic surfactants and nonionic surfactants are preferred. According to need, additives for the ink-jet recording ink such as an antiseptic agent, an antibacterial agent, an antifoamer, an antioxidant, and an ultraviolet absorber are appropriately added to adjust the quantity of the aqueous medium and the pigment content. In addition, the ink-jet recording ink may be produced by directly mixing the colored kneaded material with the aqueous medium that has been appropriately blended with the aforementioned additives in the dispersion step.

The aqueous pigment liquid dispersion and the ink-jet recording ink of the present invention are thermally stable, and impart the good stability, in which the sedimentation rarely occurs even in a low viscous medium, to pigments that intrinsically tends to precipitate. In addition, the image, which is formed by an ink-jet recording method with the ink-jet recording ink of the present invention, shows excellent luster, and has high quality in that the excellent light fastness and the color-developing property, which Pigment Yellow 155 intrinsically has, are simultaneously achieved.

EXAMPLES

Hereinafter, the present invention is further described in detail with reference to Examples.

In the following Synthesis Examples, Examples, and Comparative Examples, "part" and "%" represent "part by mass" and "mass %".

Synthesis Example 1

In the reactor including a stirrer, a dropping device, and a reflux device, 100 parts of methyl ethyl ketone was added, and nitrogen substitution was performed in the reactor while stirring. While keeping nitrogen atmosphere in the reactor, heating was performed to reflux methyl ethyl ketone, and then, the mixed solution of 77 parts of styrene, 10 parts of acrylic acid, 13 parts of methacrylic acid, and 8 parts of the polymerization catalyst (produced by Wako Pure Chemical Industries, Ltd./ "V-59") was added dropwise from the dropping device for 2 hours. From the middle of dropping, temperature of the reaction system was kept at 80° C.

After the end of dropping, the reaction was kept at the same temperature for 25 hours. In the middle of the reaction, while checking the consumption of the raw materials, the polymerization catalyst was added appropriately. After the end of the reaction, methyl ethyl ketone was evaporated under the decreased pressure, and the obtained solid was crushed so as to obtain the powders of the styrene-acrylic acid-based copolymer (A-1). It has an acid value of 152 mgKOH/g and a weight average molecular weight of 11,000.

In the present invention, a weight average molecular weight is a value which is measured by a GPC (Gel Permeation Chromatography) method and is converted to the molecular weight of polystyrene used as a standard material. Herein, the measurement was performed by using the following apparatuses and conditions.

Solution-sending pump: LC-9A
System controller: SLC-6B
Auto injector: S1L-6B
Detector: RID-6A
These are manufactured by Shimazu Corporation.
Data processing software: Sic480II data station (manufactured by System Instruments Corporation).

Column: GL-R400 (a guard column)+GL-R440+GL-R450+GL-R400M (made by Hitachi Chemical Co., Ltd.)
Elution solvent: THF
Elution flow rate: 2 ml/min
Column temperature: 35° C.

Synthesis Example 2

In accordance with the production method of Synthesis Example 1, the following styrene-acrylic acid copolymers were synthesized by adjusting the reaction conditions: the styrene-acrylic acid-based copolymer having the composition ratio of the monomer units of styrene/acrylic acid/methacrylic acid=77/10/13 (mass ratio), a weight average molecular weight of 8,500, an acid value of 154 mgKOH/g, and a glass transition temperature of 107° C.

Example 1

Preparation of Pigment Dispersion (Solid Colored Kneaded Material)

10.0 g of Pigment Yellow 155 powder (manufactured by Clariant Japan K.K./Ink Jet Yellow 4GP) and 2.0 g of the styrene-acrylic acid-based copolymer (A-1) that is obtained in Synthetic Example 1 were mixed in a mortar with a volume of 1 L which was heated at 40° C., to thereby obtain the mixed powder. Into this mixed powder, 2.4 g of diethylene glycol, 0.8 g of dipropylene glycol, and 0.91 g of an 8 N potassium hydroxide aqueous solution (solid content=34 mass %) were added, to thereby prepare the mixture. The kneading was performed for 40 minutes by pressing the mixture in a solid state using a pestle, to thereby obtain the sphere-shaped colored kneaded material. During the kneading, the pigment powder began to aggregate, and then formed a lump. The apparent volume thereof was decreased from 24 $cm^3$ at the beginning of the kneading to 14 $cm^3$ at the state of the colored kneaded material.
(Preparation of Pigment Liquid Dispersion and Ink-Jet Recording Ink)

To the obtained colored kneaded material, 24 g of water was added dropwise at about 42° C., and then, 3.2 g of diethylene glycol was added, to thereby obtain the pigment liquid dispersion.

Subsequently, this pigment liquid dispersion was subjected to the centrifugal separation at 12,800G for 10 minutes using the centrifugal separator H-600S manufactured by KOKUSAN Co. Ltd. (Rotor number I), to thereby obtain the aqueous pigment liquid dispersion with a pigment content of 14.6%. Herein, G represents a unit of gravitational acceleration (about 9.8 $m/s^2$). Moreover, the obtained aqueous pigment liquid dispersion was used at the following composition, to thereby prepare the ink-jet recording ink with a pigment content of 4%. The evaluation results were shown in Table 1.

| | |
|---|---|
| Aqueous pigment liquid dispersion | 5.52 parts |
| 2-Pyrrolidinone | 1.60 parts |
| Triethylene glycol monobutyl ether | 1.60 parts |
| Acetylene glycol-based surfactant Surfynol 440 (manufactured by Nissin Chemical Industry Co., Ltd.) | 0.10 parts |
| Glycerine | 0.60 parts |
| Ion-exchanged water | 11 parts |

Example 2

10.0 g of Pigment Yellow 155 powder (manufactured by Clariant Japan K.K./Ink Jet Yellow 4GP) and 2.0 g of the styrene-acrylic acid-based copolymer (A-1) that is obtained in Synthetic Example 1 were mixed in a mortar with a volume of 1 L which was heated at 40° C., to thereby obtain the mixed powder. Into this mixed powder, 2.8 g of diethylene glycol, 0.8 g of dipropylene glycol, and 0.91 g of an 8 N potassium hydroxide aqueous solution (solid content=34 mass %) were added, to thereby prepare the mixture. The kneading was performed for 40 minutes by pressing the mixture in a solid state using a pestle, to thereby obtain the sphere-shaped colored kneaded material. During the kneading, the pigment powder began to aggregate, and then the apparent volume thereof was decreased from 24 $cm^3$ at the beginning of the kneading to 14 $cm^3$ in the state of the colored kneaded material.

To the obtained colored kneaded material, i.e. the pigment dispersion, 20 g of water was added dropwise at about 30° C., and then, 7.2 g of diethylene glycol was added, to thereby obtain the pigment liquid dispersion. In addition, this pigment liquid dispersion was transferred to a polypropylene bottle with a volume of 250 mL having 400 g of zirconia beads (particle diameter=1.25 mm), and was shaken by a paint shaker for 10 minutes, to thereby perform the homogenization.

The obtained aqueous pigment liquid dispersion was subjected to the centrifugal separation step in the same manner as in Example 1, and was used at the same composition as in Example 1, to thereby prepare the ink-jet recording ink. The evaluation results were shown in Table 1.

Example 3

The same operations as in Example 2 were performed other than the replacement of 0.8 g of dipropylene glycol with the same quantity of 1,2-hexanediol, to thereby obtain the pigment dispersion (solid colored kneaded material), the aqueous pigment liquid dispersion, and the ink-jet recording ink. The evaluation results were shown in Table 1.

Example 4

The same operations as in Example 2 were performed other than the replacement of 0.8 g of dipropylene glycol with the same quantity of 2-ethyl-1,3-hexanediol, to thereby obtain the pigment dispersion (solid colored kneaded material), the aqueous pigment liquid dispersion, and the ink-jet recording ink. The evaluation results were shown in Table 1.

Comparative Example 1

The same operations as in Example 2 were performed other than the elimination of 0.8 g of dipropylene glycol and the change of the quantity of diethylene glycol from 2.4 g to 3.2 g, to thereby obtain the pigment dispersion (solid colored kneaded material), the aqueous pigment liquid dispersion, and the ink-jet recording ink. The evaluation results were shown in Table 1.

Comparative Example 2

To 10.0 g of Pigment Yellow 155 powder (manufactured by Clariant Japan K.K./Ink Jet Yellow 4GP), 2.0 g of the styrene-acrylic acid-based copolymer (A-1) that is obtained in Synthetic Example 1, 60 g of diethylene glycol, 0.8 g of dipropylene glycol, 0.91 g of a potassium hydroxide aqueous solution (8 N, solid content=34 mass %), and 24 g of water were added dropwise, and subsequently, 3.2 g of diethylene glycol was added to thereby obtain the mixture. This mixture, i.e. the pigment liquid dispersion, was transferred to a polypropylene bottle with a volume of 250 mL having 400 g of zirconia beads (particle diameter=1.25 mm), and was shaken by a paint shaker for 10 minutes. This Comparative Example 2 was the same as Example 2 in terms of the resultant composition, but different therefrom in terms of lack of the kneading step and the use of only a paint shaker for the production of the aqueous pigment liquid dispersion.

The obtained aqueous pigment liquid dispersion was subjected to the centrifugal separation step in the same manner as in Example 2, and was used at the same composition as in Example 2, to thereby obtain the ink-jet recording ink. The evaluation results were shown in Table 1.

Comparative Example 3

The same operations as in Comparative Example 2 were performed other than the replacement of 0.8 g of dipropylene glycol with the same quantity of 1,2-hexanediol, to thereby obtain the aqueous pigment liquid dispersion and the ink-jet recording ink. The evaluation results were shown in Table 1.

Comparative Example 4

10.0 g of Pigment Yellow 155 powder (manufactured by Clariant Japan K.K./Ink Jet Yellow 4GP) and 2.0 g of the styrene-acrylic acid-based copolymer (A-1) that is obtained in Synthetic Example 1 were mixed in a mortar with a volume of 1 L which was heated at 40° C., to thereby obtain the mixed powder. Into this mixed powder, 2.8 g of diethylene glycol and 0.91 g of an 8 N potassium hydroxide aqueous solution (solid content=34 mass %) were added, to thereby prepare the mixture. The kneading was performed for 40 minutes by pressing the mixture in a solid state using a pestle, to thereby obtain the sphere-shaped colored kneaded material. During the kneading, the pigment powder began to aggregate, and then the apparent volume thereof was decreased from 24 cm$^3$ at the beginning of the kneading to 15 cm$^3$ in the state of the colored kneaded material.

To the obtained colored kneaded material, i.e. the pigment dispersion, 20 g of water and 0.8 g of dipropylene glycol were added dropwise at about 30° C., and then, 7.2 g of diethylene glycol was added, to thereby obtain the pigment liquid dispersion. In addition, this pigment liquid dispersion was transferred to a polypropylene bottle with a volume of 250 mL having 400 g of zirconia beads (particle diameter=1.25 mm), and was shaken by a paint shaker (PS) for 10 minutes, to thereby perform the dispersion. This Comparative Example 4 was the same as Example 2 in terms of the resultant composition, but different therefrom in that the addition of dipropylene glycol was performed in the dispersion step for the production of the liquid dispersion rather than the kneading step.

The obtained aqueous pigment liquid dispersion was subjected to the centrifugal separation step in the same manner as in Example 1, to thereby obtain the ink. The evaluation results were shown in Table 1.

Examples 5 to 9

The same operations as in Comparative Example 2 were performed other than the replacement of 2.0 g of the styrene-acrylic acid-based copolymer (A-1) that was obtained in Synthesis Example 1 with 3.0 g of the styrene-acrylic acid-based copolymer (A-2) that was obtained in Synthesis Example 2, and the changes of the types and the addition quantities of the diol compound (e) as described in Table 2, to thereby obtain the aqueous pigment liquid dispersion and the ink-jet recording ink. The evaluation results were shown in Table 2.

Comparative Example 5

The same operations as in Example 5 were performed other than the elimination of 0.8 g of dipropylene glycol and the change of the quantity of diethylene glycol from 2.4 g to 3.2 g, to thereby obtain the pigment dispersion (solid colored kneaded material), the aqueous pigment liquid dispersion, and the ink-jet recording ink. The evaluation results were shown in Table 2.

Comparative Examples 6 to 16

The same operations as in Example 2 were performed other than the replacement of 2.0 g of the styrene-acrylic acid-based copolymer (A-1) that was obtained in Synthesis Example 1 with 3.0 g of the styrene-acrylic acid-based copolymer (A-2) that was obtained in Synthesis Example 2, and the changes of the types and the addition quantities of the diol compound (e) as described in Table 2, to thereby obtain the aqueous pigment liquid dispersion and the ink-jet recording ink. The evaluation results were shown in Table 2.

Comparative Example 17

The same operations as in Example 2 were performed other than the replacement of 10.0 g of Pigment Yellow 155 with the same quantity of Pigment Yellow 213 (manufactured by Clariant Japan K.K./Ink Jet Yellow H5G), to thereby obtain the pigment dispersion (solid colored kneaded material), the aqueous pigment liquid dispersion, and the ink-jet recording ink. The evaluation results were shown in Table 3.

Reference Example 1

The same operations as in Comparative Example 1 were performed other than the replacement of 10.0 g of Pigment Yellow 155 with the same quantity of Pigment Yellow 213 (manufactured by Clariant Japan K.K./Ink Jet Yellow H5G), to thereby obtain the pigment dispersion (solid colored kneaded material), the aqueous pigment liquid dispersion, and the ink-jet recording ink. The evaluation results were shown in Table 3.

Comparative Example 18

The same operations as in Example 2 were performed other than the replacement of 10.0 g of Pigment Yellow 155 with the same quantity of Pigment Blue 15:3 (manufactured by DIC Corporation/Fastogen Blue 5310 SD), to thereby obtain the pigment dispersion (solid colored kneaded material), the aqueous pigment liquid dispersion, and the ink-jet recording ink. The evaluation results were shown in Table 4.

Reference Example 2

The same operations as in Comparative Example 1 were performed other than the replacement of 10.0 g of Pigment Yellow 155 with the same quantity of pigment blue 15:3 (manufactured by DIC Corporation/Fastogen Blue 5310 SD), to thereby obtain the pigment dispersion (solid colored kneaded material), the aqueous pigment liquid dispersion, and the ink-jet recording ink. The evaluation results were shown in Table 4.

Comparative Example 19

The same operations as in Example 2 were performed other than the replacement of 10.0 g of Pigment Yellow 155 with the same quantity of Pigment Red 168 (manufactured by Clariant Japan K.K./Hostaperm Scarlet GO transp), to thereby obtain the pigment dispersion (solid colored kneaded material), the aqueous pigment liquid dispersion, and the ink-jet recording ink. The evaluation results were shown in Table 5.

Reference Example 3

The same operations as in Comparative Example 1 were performed other than the replacement of 10.0 g of Pigment Yellow 155 with the same quantity of Pigment Red 168 (manufactured by Clariant Japan K.K./Hostaperm Scarlet GO transp), to thereby obtain the pigment dispersion (solid colored kneaded material), the aqueous pigment liquid dispersion, and the ink-jet recording ink. The evaluation results were shown in Table 5.

Example 10

| | |
|---|---|
| Pigment Yellow 155 (manufactured by Clariant Japan K.K./Ink Jet Yellow 4GP) | 500 parts |
| Styrene-acrylic acid-based copolymer (A-1) | 100 parts |
| Diethylene glycol | 90 parts |
| Dipropylene glycol | 40 parts |
| 8 N Potassium hydroxide aqueous solution (solid content = 34 mass %) | 45.3 parts |

The aforementioned components were sequentially added in the planetary mixer (manufactured by Inoue Manufacturing Co., Ltd./PLM-50) which was kept at 60° C., and began to be kneaded at a rotation frequency of 59 rpm and a revolution frequency of 22 rpm. After a lapse of 30 minutes, the mixture was aggregated in the shape of a rod, and the kneading was kept for 240 minutes, to thereby obtain the pigment dispersion (solid colored kneaded material).

During kneading, the consumed current value for 240 minutes was 6 to 12 ampere, and the increase and decrease were repeated depending on the rotational period. This was due to the following reason. The mixture was a semisolid with an extremely high viscosity so that it was not distributed uniformly. Therefore, whenever the stirring blade sheared the mixture periodically, a strong force was applied thereto.

After a lapse of 240 minutes, 400 parts of the mixed solvent of ion-exchanged water and diethylene glycol (mass ratio thereof=1/1) was added while taking 3 hours, and 1,000 parts of ion-exchanged water was added, to thereby obtain the uniform mixture with a pigment content of 22.9%.

The obtained mixture was transferred into a stainless drum, and then, 550 parts of ion-exchanged water was added thereto. This mixture passed through the beads mill (manufactured by Asada Iron Works. Co. Ltd./Nano Mill NM-G-2L), and was dispersed at a temperature of 25° C. with a residence time of 1.25 minutes, to thereby obtain the aqueous pigment liquid dispersion.

Subsequently, this liquid dispersion was transferred into the continuous centrifugal separation apparatus (manufactured by Kokusan Enshinki Co. Ltd./H-600S, a volume of 2 L), and the centrifugal separation was continuously performed at a temperature of 35° C. with a centrifugal force of 18,900 G and with a residence time of 10 minutes. Then, ion-exchanged water and diethylene glycol was added thereto, to thereby obtain the aqueous pigment dispersion in which the pigment content was adjusted to 14.5%. The subsequent operations were performed in the same manner as Example 2, to thereby produce the ink-jet recording ink. The evaluation results were shown in Table 6.

Example 11

The same operations as in Example 10 were performed other than the replacement of 40 parts of dipropylene glycol with the same quantity of 1,2-hexanediol, to thereby obtain the pigment dispersion (solid colored kneaded material), the aqueous pigment liquid dispersion, and the ink-jet recording ink. The evaluation results were shown in Table 5. Herein, 32 minutes were taken from the beginning of the kneading until the mixture was aggregated in the shape of a rod.

Comparative Example 20

The same operations as in Example 10 were performed other than the elimination of 1,2-hexanediol, to thereby obtain the pigment dispersion (solid colored kneaded material), the aqueous pigment liquid dispersion, and the ink-jet recording ink. The evaluation results were shown in Table 6. Herein, 45 minutes were taken from the beginning of the kneading until the mixture was aggregated in the shape of a rod.

The aqueous pigment liquid dispersion s and the ink-jet recording inks obtained in the aforementioned Examples and Comparative Examples were evaluated by using the following evaluation items and evaluation methods.

<Evaluation of Dispersion Property>

The particle diameters, the viscosities, and the sedimentation properties of the obtained aqueous pigment liquid dispersions were measured. Regarding a particle diameter, the volume average particle diameters were measured by using "Microtrac UPA 150" (manufactured by Leeds & Northrup Co.) as the particle diameters of the aqueous dispersions. The viscosities were measured at 25° C. by using E type viscometer (TVE-20L manufactured by TOKIMEC INC.). Regarding sedimentation properties, the aqueous pigment liquid dispersions were preserved in glass vials with a volume of 10 mL at 25° C. for 2 weeks. After the preservations, the glass vials were reversed, and the sedimentations at the bottom part were visually observed and evaluated by using the following evaluation criteria.

"Large sedimentation" means that the attachment of the pigment particles to the wall surface was significant when the glass vials were reversed.

"Medium sedimentation" means that the attachment of the pigment particles to the wall surface was able to be found when the glass vials were reversed.

"Small sedimentation" means that the attachment of the pigment particles to the wall surface was rarely found when the glass vials were reversed.

<Evaluation of Ink-Jet Recording Ink>
<Evaluation of Luster>

The aforementioned ink-jet recording ink was loaded into the position of the black cartridge in the ink-jet printer EM-930C (manufactured by Seiko Epson Corporation), and the recording with an image density of 100% was performed by using the Premium Glossy Photo Paper (manufactured by Seiko Epson Corporation) as a recording medium. Then, the luster of the obtained image was measured by using "Micro-TRI-Gloss" (manufactured by BYK-Gardner) as a Gloss value at an angle of 20°. Herein, the values representing the aforementioned luster were the values at an image density of 95%.

TABLE 1

Pigment Yellow 155

| | Ink Composition | | | | | | Properties | | | |
|---|---|---|---|---|---|---|---|---|---|---|
| | Diol Compound | | | Resin | | | Properties of Liquid Dispersion | | | |
| | Used Diol Compound | Mass % per Pigment | Addition Time of Diol Compound | Resin Molecular Weight | Resin/ Pigment | Production Method | Average Particle Diameter (nm) | Sedi- mentation | Viscosity (mPa·s) | Ink properties Luster |
| Example 1 | Dipropylene Glycol | 8% | During Kneading | 11,000 | 0.2 | Kneading | 105 | Small | 4.8 | 59 |
| Example 2 | Dipropylene Glycol | 8% | During Kneading | 11,000 | 0.2 | Kneading + PS | 105 | Small | 4.9 | 58 |
| Example 3 | 1,2-Hexanediol | 8% | During Kneading | 11,000 | 0.2 | Kneading + PS | 112 | Small | 4.9 | 55 |
| Example 4 | 2-Ethyl-1,3-hexanediol | 8% | During Kneading | 11,000 | 0.2 | Kneading + PS | 113 | Small | 4.9 | 53 |
| Comparative Example 1 | N/A | 0% | N/A | 11,000 | 0.2 | Kneading + PS | 150 | Large | 5.4 | 40 |
| Comparative Example 2 | Dipropylene Glycol | 8% | During Dispersion | 11,000 | 0.2 | PS | 128 | Medium | 9.1 | 41 |
| Comparative Example 3 | 1,2-Hexanediol | 8% | During Dispersion | 11,000 | 0.2 | PS | 132 | Medium | 9.0 | 40 |
| Comparative Example 4 | Dipropylene Glycol | 8% | During Dispersion | 11,000 | 0.2 | Kneading + PS | 149 | Large | 5.4 | 40 |

In the aqueous pigment liquid dispersions of Examples 1 to 4, which included dipropylene glycol, 1,2-hexanediol, or 2-ethyl-1,3-hexanediol, and were subjected to the kneading step, the average particle diameters were short, and the sedimentations were small. In addition, the images that were formed of the ink-jet recording inks produced by these liquid dispersions had high luster. In contrast, in the aqueous pigment liquid dispersion of Comparative Example 1, which did not include the diol compound, the average particle diameter significantly increased, and the sedimentation was large. In the aqueous pigment liquid dispersions of Comparative Examples 2 and 3, which were not subjected to the kneading step, the sedimentations still occurred although the degrees thereof were milder than that of Comparative Example 1. Moreover, the average particle diameters increased, and so the luster decreased. Furthermore, the styrene-acrylic acid-based resins did not adsorb to the pigment surface well and were present in the aqueous medium so that the viscosities increased. In the aqueous pigment liquid dispersion of Comparative Example 4, in which the diol compound was added during the dispersion step, the kneading was not performed so well that the average particle diameter was coarse and that the sedimentation was large.

TABLE 2

Pigment Yellow 155

| | Ink Composition | | | | | | Properties | | | |
|---|---|---|---|---|---|---|---|---|---|---|
| | Diol Compound | | Resin | | | | Properties of Liquid Dispersion | | | |
| | Used Diol Compound | Mass % per Pigment | Resin Molecular Weight | Resin/ Pigment | Production Method | | Average Particle Diameter (nm) | Sedi- mentation | Viscosity (mPa·s) | Ink properties Luster |
| Example 5 | Dipropylene Glycol | 4% | 8,500 | 0.3 | Kneading + PS | | 115 | Small | 5.2 | 50 |
| Example 6 | Dipropylene Glycol | 6% | 8,500 | 0.3 | Kneading + PS | | 95 | Small | 5.2 | 56 |
| Example 7 | Dipropylene Glycol | 8% | 8,500 | 0.3 | Kneading + PS | | 86 | Small | 5.2 | 55 |
| Example 8 | 1,2-Hexanediol | 8% | 8,500 | 0.3 | Kneading + PS | | 100 | Small | 5.0 | 58 |
| Example 9 | 2-Ethyl-1,3-hexanediol | 8% | 8,500 | 0.3 | Kneading + PS | | 94 | Small | 5.1 | 56 |
| Comparative Example 5 | N/A | 0% | 8,500 | 0.3 | Kneading + PS | | 126 | Large | 5.3 | 38 |
| Comparative Example 6 | Dipropylene Glycol | 20% | 8,500 | 0.3 | Kneading + PS | | 100 | Large | 6.7 | 35 |
| Comparative Example 7 | Dipropylene Glycol | 30% | 8,500 | 0.3 | Kneading + PS | | 115 | Large | 14.9 | 30 |
| Comparative Example 8 | Dipropylene Glycol | 50% | 8,500 | 0.3 | Kneading + PS | | 158 | Large | 123.1 | 22 |
| Comparative Example 9 | 1,2-Propanediol | 8% | 8,500 | 0.3 | Kneading + PS | | 129 | Large | 5.8 | 40 |

TABLE 2-continued

Pigment Yellow 155

| | Ink Composition | | | | Properties | | | |
| --- | --- | --- | --- | --- | --- | --- | --- | --- |
| | Diol Compound | | Resin | | | Properties of Liquid Dispersion | | Ink properties |
| | Used Diol Compound | Mass % per Pigment | Molecular Weight | Resin/ Pigment | Production Method | Average Particle Diameter (nm) | Sedimentation | Viscosity (mPa·s) | Luster |
| Comparative Example 10 | 1,2-butanediol | 8% | 8,500 | 0.3 | Kneading + PS | 195 | Large | 12.1 | 39 |
| Comparative Example 11 | 1,3-butanediol | 8% | 8,500 | 0.3 | Kneading + PS | 122 | Large | 5.4 | 39 |
| Comparative Example 12 | 1,4-butanediol | 8% | 8,500 | 0.3 | Kneading + PS | 138 | Large | 5.3 | 38 |
| Comparative Example 13 | 1,5-Pentanediol | 8% | 8,500 | 0.3 | Kneading + PS | 125 | Large | 5.8 | 40 |
| Comparative Example 14 | 1,6-Hexanediol | 8% | 8,500 | 0.3 | Kneading + PS | 117 | Large | 5.3 | 41 |
| Comparative Example 15 | 3-Methyl-1,5-pentanediol | 8% | 8,500 | 0.3 | Kneading + PS | 177 | Large | 8.9 | 38 |
| Comparative Example 16 | 2-Methyl-2,4-pentanediol | 8% | 8,500 | 0.3 | Kneading + PS | 135 | Large | 7.4 | 39 |

In the aqueous pigment liquid dispersions of Examples 5 to 9, which included dipropylene glycol, 1,2-hexanediol, or 2-ethyl-1,3-hexanediol within the quantitative range defined in the present invention, and were subjected to the kneading step, the average particle diameters were short, and the sedimentations were small. In addition, the images that were formed of the ink-jet recording inks produced by these liquid dispersions had high luster. In contrast, in the aqueous pigment liquid dispersions of Comparative Examples 5 to 8, which included the diol compound beyond the quantitative range defined in the present invention, the sedimentations increased, and the luster decreased.

In the aqueous pigment liquid dispersions of Comparative Examples 9 to 16, which included a diol compound other than the diol compound selected from the group consisting of dipropylene glycol, 1,2-hexanediol, and 2-ethyl-1,3-hexanediol, the average particle diameters and the sedimentations increased, and the luster decreased.

TABLE 3

Pigment Yellow 213

| | Ink Composition | | | | Properties | | | |
| --- | --- | --- | --- | --- | --- | --- | --- | --- |
| | Diol Compound | | Resin | | | Properties of Liquid Dispersion | | Ink properties |
| | Used Diol Compound | Mass % per Pigment | Molecular Weight | Resin/ Pigment | Production Method | Average Particle Diameter (nm) | Sedimentation | Viscosity (mPa·s) | Luster |
| Comparative Example 17 | Dipropylene Glycol | 8% | 11,000 | 0.2 | Kneading + PS | 256 | Large | 11.6 | 19 |
| Reference Example 1 | N/A | 0% | 11,000 | 0.2 | Kneading + PS | 191 | Large | 6.5 | 22 |

TABLE 4

Pigment Blue 15:3

| | Ink Composition | | | | Properties | | | |
| --- | --- | --- | --- | --- | --- | --- | --- | --- |
| | Diol Compound | | Resin | | | Properties of Liquid Dispersion | | Ink properties |
| | Used Diol Compound | Mass % per Pigment | Molecular Weight | Resin/ Pigment | Production Method | Average Particle Diameter (nm) | Sedimentation | Viscosity (mPa·s) | Luster |
| Comparative Example 18 | Dipropylene Glycol | 8% | 11,000 | 0.2 | Kneading + PS | 151 | Small | 9.4 | 25 |
| Reference Example 2 | N/A | 0% | 11,000 | 0.2 | Kneading + PS | 147 | Small | 9.5 | 25 |

TABLE 5

Pigment Red 168

| | Ink Composition | | | | Properties | | | |
|---|---|---|---|---|---|---|---|---|
| | Diol Compound | | Resin | | Properties of Liquid Dispersion | | | |
| | Used Diol Compound | Mass % per Pigment | Molecular Weight | Resin/ Pigment | Production Method | Average Particle Diameter (nm) | Sedimentation | Viscosity (mPa·s) | Ink properties Luster |
| Comparative Example 19 | Dipropylene Glycol | 8% | 11,000 | 0.2 | Kneading + PS | 111 | Large | 4.8 | 24 |
| Reference Example 3 | N/A | 0% | 11,000 | 0.2 | Kneading + PS | 94 | Large | 4.6 | 24 |

As shown in Tables 3, 4, and 5, regarding Pigment Yellow 213, Pigment Blue 15:3, and Pigment Red 168, the addition of dipropylene glycol had no effect on the sedimentations, the luster was not improved, the average particle diameters increased on the contrary. Accordingly, it was found that the advantageous effects obtained by adding the diol compound during the kneading step are specific to bisacetoacetarylide pigments as typified by Pigment Yellow 155, and are not shown for all types of pigments.

TABLE 6

Pigment Yellow 155, 50 L Scale-Up

| | Ink Composition | | | | Properties | | | |
|---|---|---|---|---|---|---|---|---|
| | Diol Compound | | Resin | | Properties of Liquid Dispersion | | | |
| | Used Diol Compound | Mass % per Pigment | Molecular Weight | Resin/ Pigment | Production Method | Average Particle Diameter (nm) | Sedimentation | Viscosity (mPa·s) | Ink properties Luster |
| Example 10 | Dipropylene Glycol | 8% | 11,000 | 0.2 | Kneading + NM | 95 | Small | 3.2 | 67 |
| Example 11 | 1,2-Hexanediol | 8% | 11,000 | 0.2 | Kneading + NM | 96 | Small | 3.5 | 65 |
| Reference Example 2 | N/A | 0% | 11,000 | 0.2 | Kneading + NM | 116 | Large | 4.0 | 50 |

It was found from the results shown in Table 6 that the addition of the diol compound (e) such as dipropylene glycol or 1,2-hexane diol decreased the average particle diameters and the sedimentations even when the kneading step was performed using the scale-up apparatus, as much as when the kneading was performed using a mortar.

INDUSTRIAL APPLICABILITY

In an aqueous pigment liquid dispersion of the present invention, the pigments are microparticulated, and the pigment surface is well coated with resins. Therefore, this aqueous pigment liquid dispersion has so good dispersion stability that the sedimentation of the pigments rarely occurs in an aqueous medium. Also, an ink-jet recording ink, which contains the aforementioned aqueous pigment liquid dispersion as the main component, has the same dispersion stability as the aqueous pigment liquid dispersion, which is good enough that the sedimentation of the pigments rarely occurs in an aqueous medium. In addition, this ink-jet recording ink can form an image that is excellent in luster and light fastness and can be preservable over a long period. Therefore, the present invention is industrially useful.

The invention claimed is:

1. A pigment dispersion comprising:
a C. I. Pigment Yellow 155 (a); a styrene-acrylic acid-based copolymer (b); a basic compound (c); and a wetting agent (d), wherein the wetting agent (d) comprises at least one diol compound (e), the diol compound (e) is selected from the group consisting of dipropylene glycol, 2-ethyl-1,3-hexanediol, and 1,2-hexanediol the mass ratio (e)/(a) between the diol compound (e) and the C. I. Pigment Yellow 155 (a) is within a range from 3/100 to 8/100, and the pigment dispersion is 50 to 80 mass % solid at ordinary temperature.

2. The pigment dispersion according to claim 1, wherein the mass ratio (b)/(a) between the styrene-acrylic acid-based copolymer (b) and the C. I. Pigment Yellow 155 (a) is within a range from 10/100 to 40/100, and the mass ratio (d)/(a) between the wetting agent (d) and the C. I. Pigment Yellow 155 (a) is within a range from 16/100 to 35/100.

3. An aqueous pigment liquid dispersion produced by dispersing the pigment dispersion of any one of claims 1, and 2 in an aqueous medium.

4. An ink-jet recording ink comprising, as a main component, the aqueous pigment liquid dispersion of claim 3.

5. A process for producing a pigment dispersion, comprising:

a kneading step of kneading a mixture comprising a C. I. Pigment Yellow 155 (a); a styrene-acrylic acid-based copolymer (b); a basic compound (c); and a wetting agent (d), wherein the wetting agent (d) comprises a diol compound (e), the diol compound (e) is one or more diol compound selected from the group consisting of dipropylene glycol, 2-ethyl-1,3-hexanediol, and 1,2-hexanediol the mass ratio (e)/(a) between the diol compound (e) and the C. I. Pigment Yellow 155 (a) is within a range from 3/100 to 8/100 in the kneading step, and the pigment dispersion is 50 to 80 mass % solid at ordinary temperature.

6. The process for producing a pigment dispersion according to claim 5, wherein the mass ratio (b)/(a) between the styrene-acrylic acid-based copolymer (b) and the C. I. Pigment Yellow 155 (a) is within a range from 10/100 to 40/100, and the mass ratio (d)/(a) between the wetting agent (d) and the C. I. Pigment Yellow 155 (a) is within a range from 16/100 to 35/100.

7. A process for producing an aqueous pigment liquid dispersion, comprising dispersing the pigment dispersion produced using the production process of claim 5 or 6 in an aqueous medium, to thereby produce a liquid dispersion.

* * * * *